United States Patent [19]

Hong et al.

[11] Patent Number: 5,532,833
[45] Date of Patent: Jul. 2, 1996

[54] METHOD AND SYSTEM FOR DISPLAYING SELECTED PORTIONS OF A MOTION VIDEO IMAGE

[75] Inventors: Jung-Kook Hong, Tokyo; Toyohisa Kaneko, Yokohama; Junichi Takahashi, Tokyo, all of Japan

[73] Assignee: International Business Machines Corporation, Armonk, N.Y.

[21] Appl. No.: 240,803

[22] Filed: May 11, 1994

Related U.S. Application Data

[63] Continuation of Ser. No. 959,820, Oct. 13, 1992, abandoned.

[51] Int. Cl.$^6$ ............................................. H04N 5/76
[52] U.S. Cl. .......................... 358/335; 358/342; 358/311
[58] Field of Search .................................. 358/335, 310, 358/342, 311, 322; 360/14.1, 14.2, 14.3, 13; 348/714, 715, 718, 720, 552; H04N 5/92, 5/76, 5/78, 9/79, 5/781, 5/782, 5/783

[56] References Cited

U.S. PATENT DOCUMENTS

| | | | |
|---|---|---|---|
| 4,964,004 | 10/1990 | Barker | 358/335 |
| 5,050,003 | 9/1991 | Honi et al. | 358/342 |
| 5,122,886 | 6/1992 | Tanaka | 358/335 |
| 5,179,449 | 1/1993 | Doi | 358/311 |

FOREIGN PATENT DOCUMENTS 61-29939  2/1986  Japan .

OTHER PUBLICATIONS

Takafumi Miyatake, Interactive Video Editing Supported by Image Understanding Technique, Nov. 25–27, 1993, pp. 125–139.

*Primary Examiner*—Thai Q. Tran
*Attorney, Agent, or Firm*—Perman & Green

[57] ABSTRACT

A method for storing and managing motion video image information for retrieving scenes of interest in a short time from a many-hour motion video image stored in a recording medium. As motion video image information for managing and retrieving a motion video image, a whole motion video image R is hierarchically divided into frame sequences A, A1, A11 ... of shorter time according to the construction and the semantic contents thereof, and logical frame structure data representing the hierarchical relationship of the frame sequences, attribute data At of the frame sequences, and still video images rf of representative frames are generated, which are associated with each other to create a data file. Retrieval of a motion video image is performed by extracting frame sequences using the attribute data and logical frame structure as retrieval keys for the data file of the motion video image information, and confirming the contents using the still video image rf of the representative frames. Any scene can be randomly accessed and associated scenes can also be retrieved easily, and thus a motion video image of interest can quickly be retrieved from a many-hour motion video image.

12 Claims, 10 Drawing Sheets

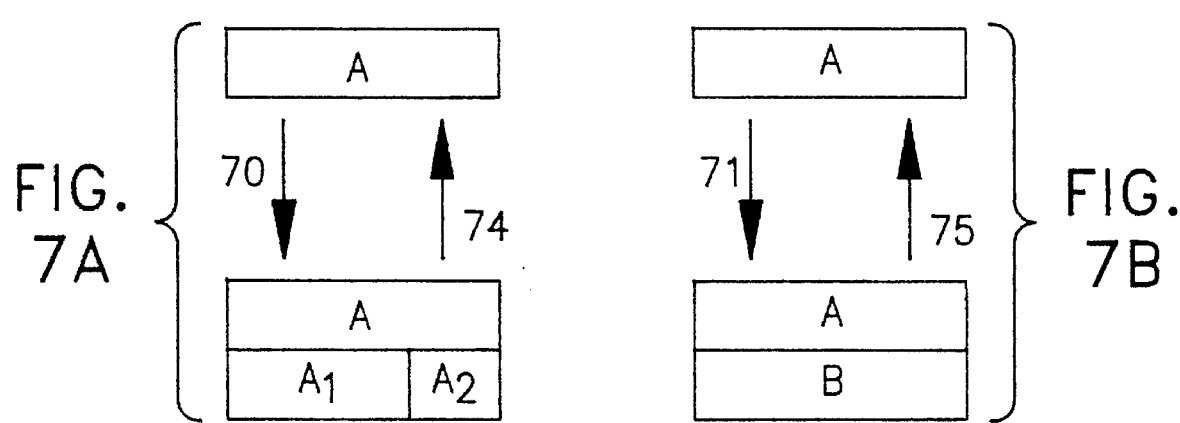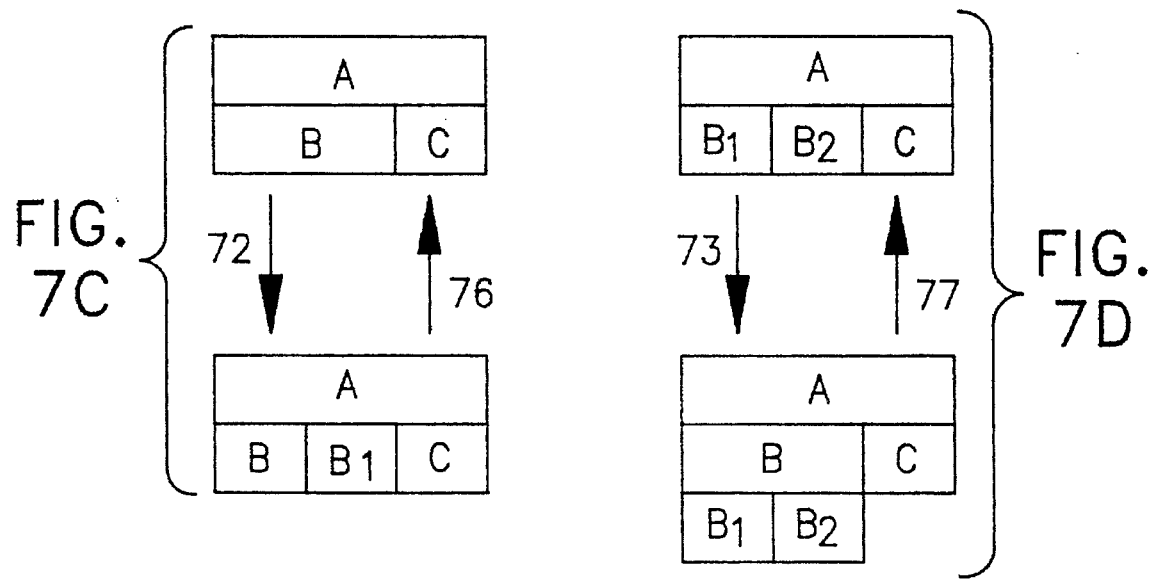

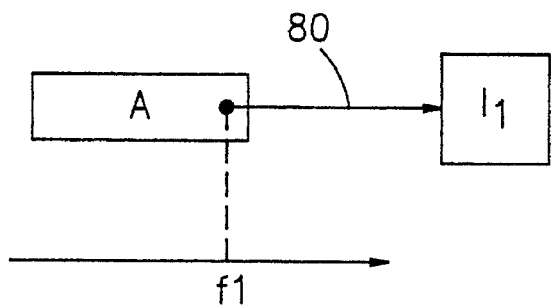
FIG.8A
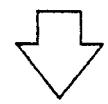
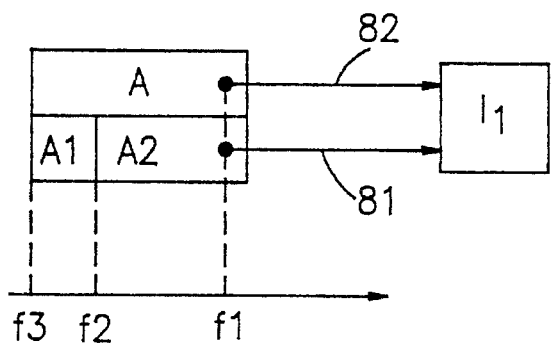
FIG.8B
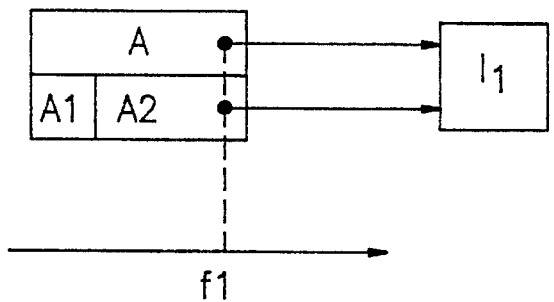
FIG.9A
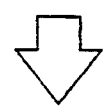
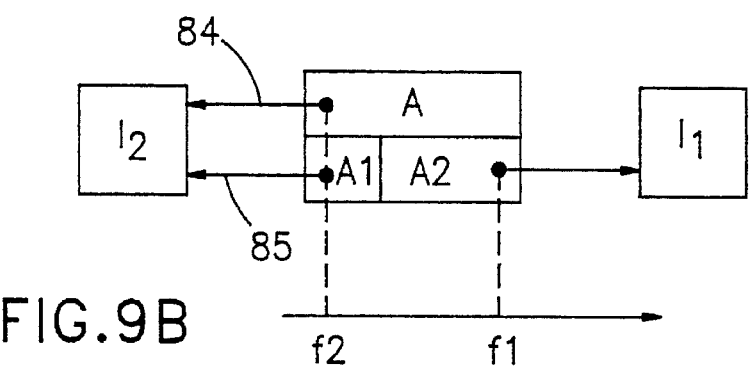
FIG.9B

METHOD AND SYSTEM FOR DISPLAYING SELECTED PORTIONS OF A MOTION VIDEO IMAGE

This is a continuation of application Ser. No. 07/959,820 filed on Oct. 13, 1992, now abandoned.

FIELD OF THE INVENTION

This invention is related to a technique of managing motion video images for randomly retrieving, reproducing and displaying motion video images stored in a recording medium.

BACKGROUND OF THE INVENTION

Video equipment for recording media having motion video images recorded therein (for instance, laser disk, VTR and 8 mm-video) has propagated, and the amount of video images accumulated in museums and homes as well as in specialized fields such as radio stations and advertising agencies has also been increasing remarkably. The accumulated video images are not only reproduced, but are also often reused to create new video images by editing. As the amount of video images stored has become tremendous, it has been increasingly necessary to have a method for managing motion video images that can efficiently locate video scenes of interest from a recording medium for reproduction and editing. There is a similar situation in the field of movies, which deals with video films.

In the conventional system for managing motion video images, frame numbers are stored in a recording medium such as a personal computer, and retrieval is performed by a user specifying the stored frame numbers. For instance, the personal computer stores frame numbers in a recording medium. The user directly specifies a frame number or frame time from an alphanumeric input device, or the personal computer displays the still video images of frames having stored frame numbers on a display and the user selects them, thereby specifying the start frame for reproduction. The personal computer performs reproduction on a TV monitor from the specified start frame while controlling the functions provided in the videoplayer, such as frame feed, fast forward and rewind. Thus, the conventional system adopts a method in which video images to be retrieved are directly accessed by means of frame numbers and the like.

Based on such a system for managing motion video images, in Takafumi Miyatake, "Interactive Natural Motion Video Image Editing Technique", FRIEND21 3rd Results Announcement Convention, Jul. 18, 19, 1991, an approach is shown in which motion video images are divided into scenes, and the video images of the leading frames of the respective scenes are displayed on a display to roughly see the scenes to be edited. However, when motion video images that take a long time are to be edited. However, when motion video images that take a long time are to be edited, if for instance, scene change occurs at a frequency on the order of once every two seconds on the average, the number of scenes increases and thus it is difficult to roughly go into all the scenes efficiently. In addition, since the divided scenes constitute direct units of retrieval, it is not possible to retrieve them while grasping the whole structure of the motion video images, since the semantic construction of the scenes becomes complicated.

On the other hand, in the information retrieval system shown in Published Unexamined Patent Application No. 29939/1986, an approach is disclosed in which motion video images are hierarchically classified and still video images representative of the classification are hierarchically displayed as a menu for selection by a user. However, the classification hierarchy must be sequentially traversed from the highest level to the lowest level before motion video images are displayed, and thus retrieval becomes inefficient as the menu hierarchy becomes deeper. Furthermore, the menu hierarchy is fixed and no data management technique is shown for modification.

OBJECTS OF THE INVENTION

It is the object of this invention to provide a novel method for storing and managing motion video images for retrieving in a short time a scene of interest from many-hour motion video images stored in a recording medium.

DISCLOSURE OF THE INVENTION

In accordance with this invention, the individual frames of motion video images are organized into a plurality of frame sequences according to physical or semantic changes in the motion video images, and motion video image information for retrieving each frame sequence is created.

The motion video image information includes a logical frame structure describing the logical structure of the individual frame sequences, the still video image data of the frames representative of the individual frame sequences, and attribute data acting as retrieval items of the individual frame sequences. The use of the motion video image information for motion video image retrieval allows random access to any scene and facilitates retrieval of the associated scenes, and thus motion video image of interest can quickly be retrieved from many-hour motion video images.

BRIEF DESCRIPTION OF THE DRAWINGS

FIG. 7 is an illustration for explaining the operation for editing and creating a logical frame structure;

FIG. 8 is an illustration for explaining a change in the logical frame structure and its effects;

FIG. 9 is an illustration for explaining a change in the representative frames and its effects;

DETAILED DESCRIPTION OF THE INVENTION

Figure 1A:
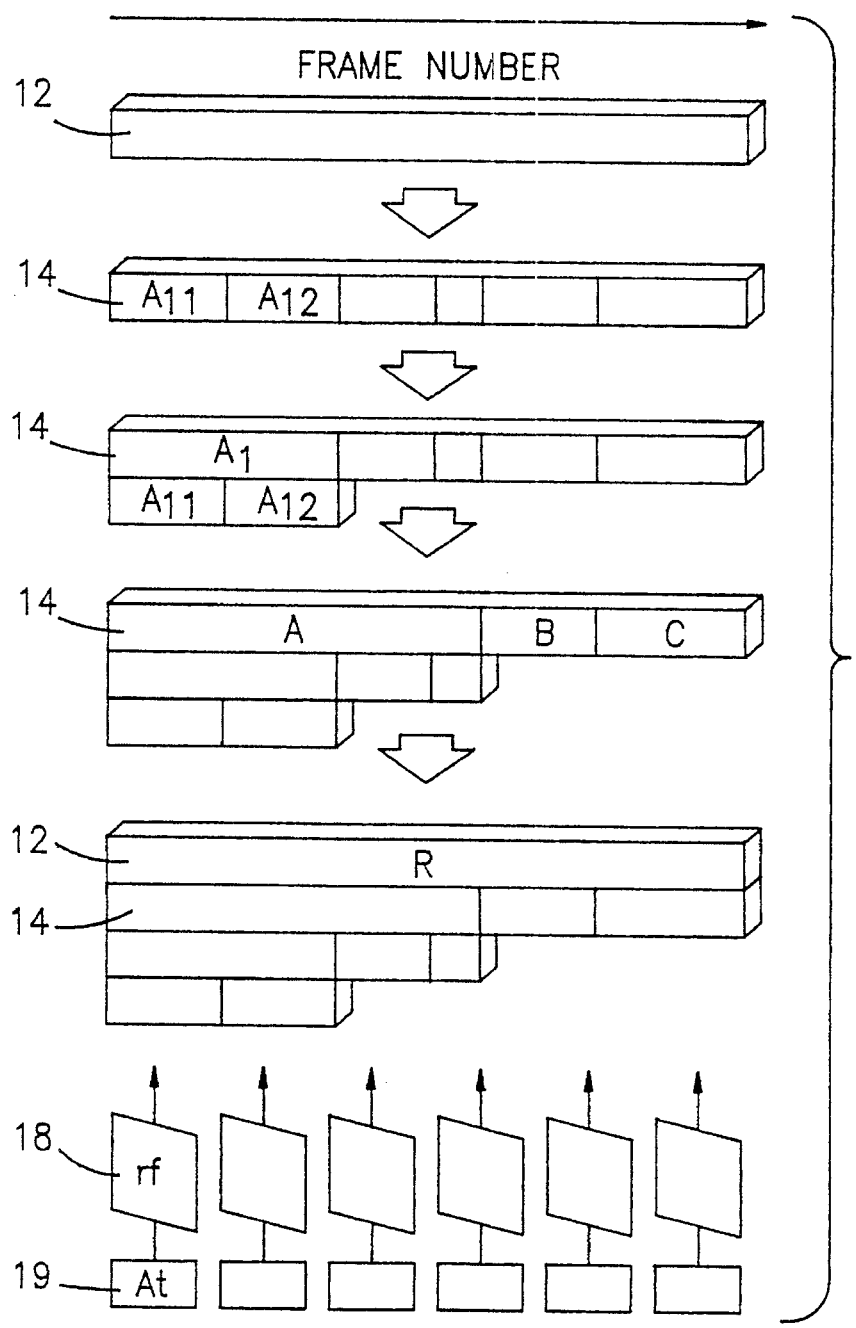
FIG. 1 is an illustration showing an example of the concept of motion video image management (bottom-up) in this invention.
Figure 1B:
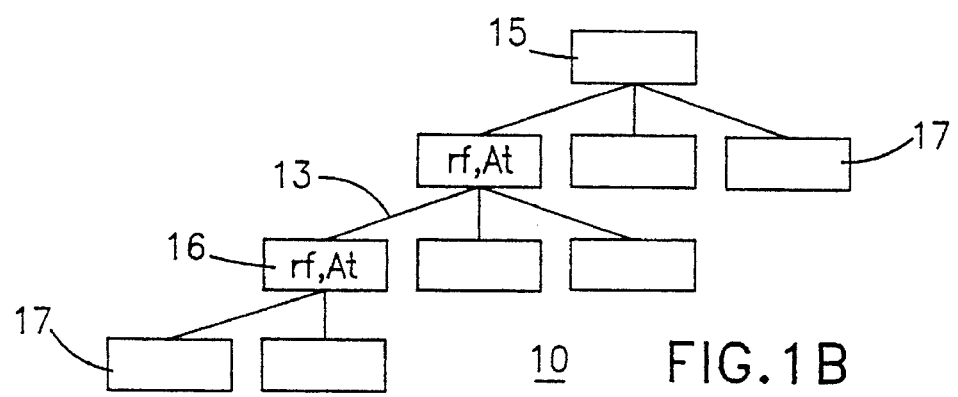

In FIG. 1, a conceptual diagram of the motion video image management using motion video image information of this invention is shown. Motion video image 12 comprising many (for instance, 30 per second) frames f1 to fn is divided into a plurality of frame sequences 14 shorter than the original motion video image a plurality of frame sequences 14 shorter than the original motion video image in time by physical changes such as cut or camera angle or semantic change of frames, as shown in (a) of the figure. Division of individual frame sequences 14 are relative and arbitrary. For instance, one frame sequence can be divided into groups of frame sequences of shorter time, and conversely, a plurality of continuous frame sequences can be merged and recognized to be a frame sequence of a higher level in semantics. To describe the logical structure of the frame sequences based on the inclusion relationship of such frames f, logical frame structure 10 as shown in (b) of the figure is created. Whole motion video image 12 corresponds to root node (R) 15 of logical frame structure 10, and the divided and merged frame sequences 14 correspond to intermediate node 16 and leaf node 17. In addition, arc 13 expressed by the vertical neighborhood relationship of nodes represents a parent-child relationship of frames. For the frame sequence corresponding to each node of logical frame structure 10, one or more frames (rf) representing that frame sequence, or representative frame 18 is arbitrarily determined and still video image data thereof is created. And by storing in each node of the logical frame structure the attribute data (At) 19 that is the retrieval item of a frame sequence along with the reference pointer to representative frame (rf), the motion video image information is completed.

Figure 2:
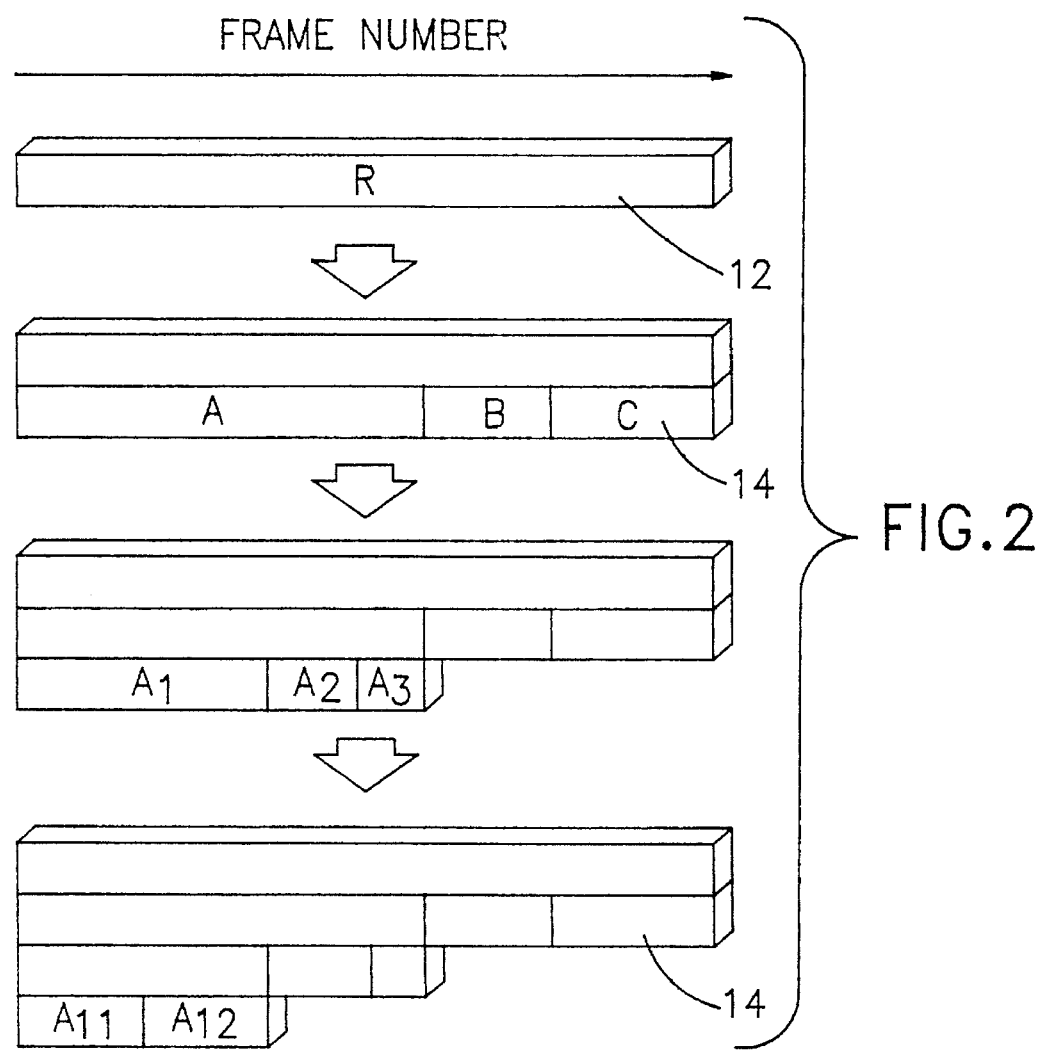
FIG. 2 is an illustration showing another example of the concept of motion video image management (top-down) in this invention.

The logical frame structure automatically detects changes in frames f1 to fn in whole video image 12 and divides them into frame sequences 14 of minimum units such as A11 and A12, generating a logical frame structure of one hierarchy level as shown in (a) of FIG. 1. Then, from these frame sequences of minimum units, a user appropriately merges adjoining frame sequences that are associated in content, for instance, A1 from A11 and A12, thereby to create a logical frame structure of multiple hierarchical levels in a bottom-up fashion. Alternatively, as shown in FIG. 2, a logical frame structure is created in a top-down fashion by dividing the stored whole motion video image 12 into arbitrary frame sequences 14, for instance, into A, B and C on the judgement of the operator, subdividing each frame sequence into arbitrary frame sequences (for instance, A into A1, A2 and A3) of shorter time, and repeating this process. In any case, logical frame structure 10 of multiple hierarchical levels is created while the frame sequences are edited (subdivided and merged again) on the basis of the contents of the scenes.

Retrieval of a motion video image is performed using the motion video image information, on the basis of checking of attribute data 19 of nodes (15, 16, 17) in logical frame structure 10 and node movement along arc 13. That is, as a retrieval condition, the condition for traversing the logical frame structure is specified, such as specifying the attribute data (At) of a frame sequence or searching the frame sequences corresponding to the nodes of parent, child and brother of the specified node in logical frame structure 10. As a result of retrieval, representative frame 18 of the frame sequence and attribute data 19 are displayed, and the motion video image is accessed for the frame sequences 14 selected by the user among them and reproduction is performed.

Figure 3:
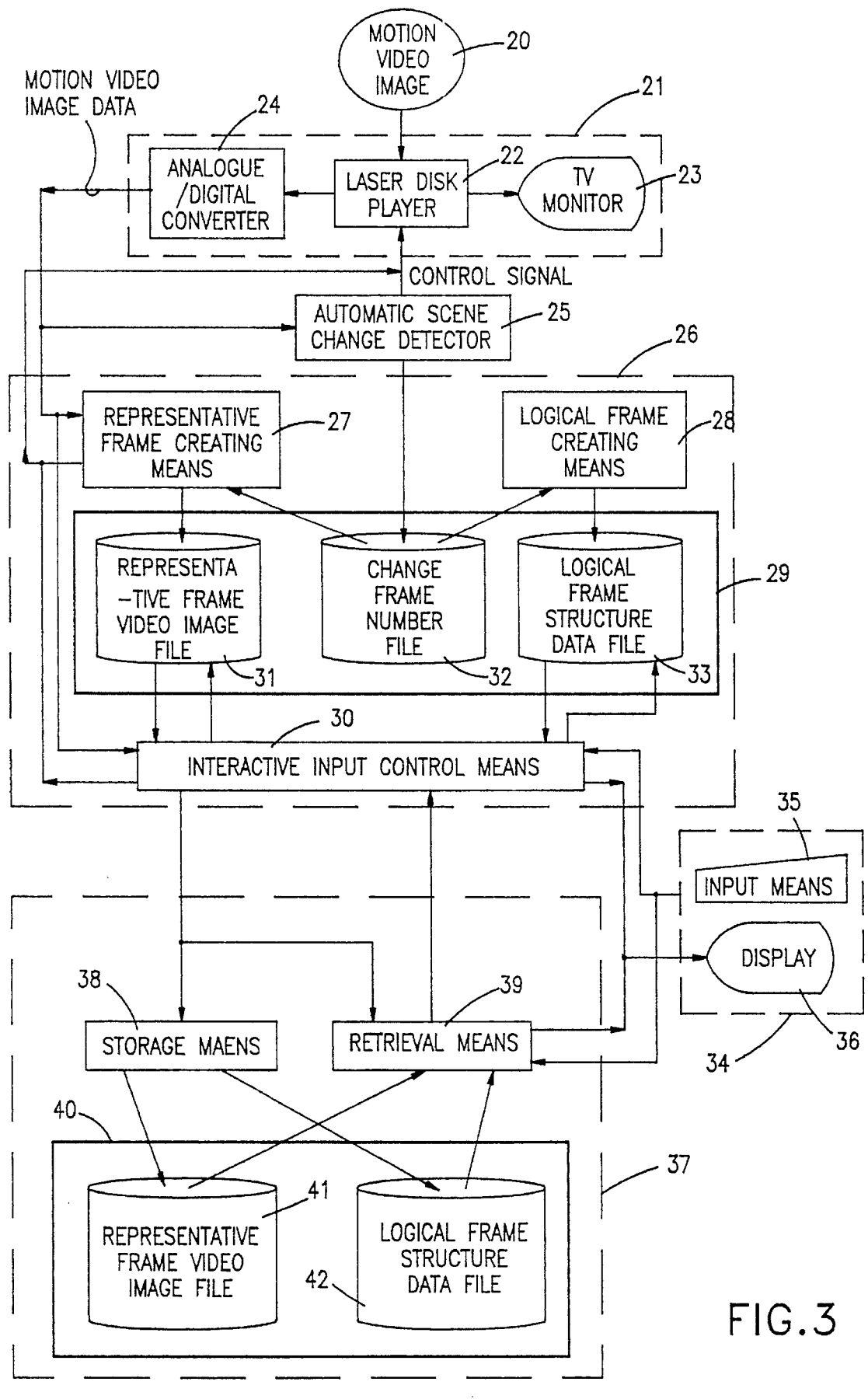
FIG. 3 is a diagram showing the configuration of the motion video image managing system according to an embodiment of this invention.

FIG. 3 shows the bottom-up type motion video image management system according to an embodiment of this invention. Motion video image 20 is stored as an analogue image in a recording medium such as a laser disk (hereinafter abbreviated as LD). 21 is a motion video image reproducing means, and includes laser disk player (hereinafter LD player) 22, TV monitor 23 and *analogue/digital converter 24. 25 is an automatic scene change detector. 26 is a retrieval information generating portion for performing the generation of various information required for the retrieval management of the motion video image, and it may be constructed either by dedicated hardware or by a combination of a personal computer and a program expressing the generation procedure (described later in FIG. 4). Retrieval information generating portion 26 includes representative frame creating means 27, logical frame structure creating means 28, memory 29 and interactive input control means 30. Memory 29 has representative frame video image file 31, change frame number file 32 and logical frame structure data file 33.

Box 34 is an interactive input means, and has input means 35 for characters and numeric values, such as a keyboard, mouse or touch panel, and display 36. Box 37 is a retrieval portion, which may be configured either by dedicated hardware or by a combination of a host computer and a program expressing a retrieval procedure (described later in FIG. 10). Retrieval portion 37 includes data storage means 38, retrieval means 39 and memory means 40, which includes representative frame video image file 41 and logical frame structure data file 42.

In the construction of FIG. 3, automatic scene change detector 25 converts the analogue video image from LD player 22 to a digital video image by means of analogue/digital converter 24 to detect scene changes, and outputs a list of the frame numbers of frames f in which scene change has occurred, and this list is stored in change frame number file 32 of retrieval information generating portion 26. Representative frame creating means 27 determines representative frames (rf) 18 for the respective frame sequences determined from the frame number list, and fetches the still frame video images of the representative frames from LD player 22 through analogue/digital converter 24, and creates and records a video image file in representative frame video image file 31. In addition, logical frame structure creating means 28 displays on display 36 the frame number list in change frame number file 32 and the still frame video image obtained from LD player 22, and based on the user input from input means 35, creates logical frame structure 10 in which attribute information At for frame sequences is stored. The representative frame video images 18 are accumulated in representative frame video image file 31, and logical frame structure 10 is accumulated in logical frame structure data file 33.

Figure 4:
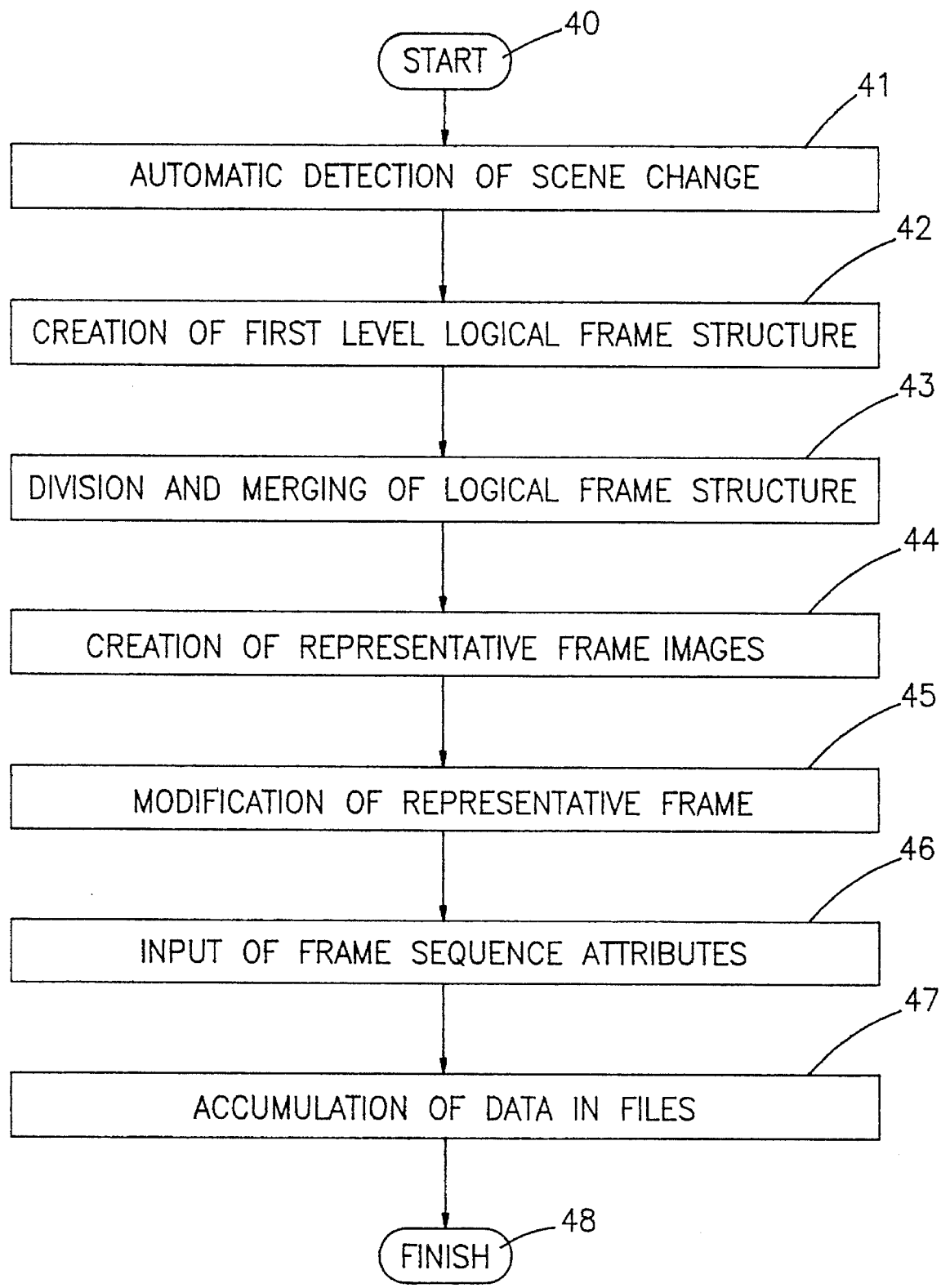
FIG. 4 is a flowchart showing an example of the procedure for creating retrieval information according to the system of FIG. 3.

Now, for the frame sequences of the motion video image, an example of the procedure for accumulating data in memory 29 by means of the system of FIG. 3 is described according to FIG. 4. First, in the first step 41, automatic scene change detector 25 detects scene change on the basis of a physical change or the like in the frames, and outputs the frame numbers of frames f which have changed to change frame number file 32. As to automatic scene change detector 25, for instance, the publicly known technique shown in the above-mentioned "Interactive Natural Motion Video Image Editing Technique" written by Takafumi Miyatake can be used, and thus detailed description thereof is omitted. In step 42, logical frame structure creating means 28 calculates the start and end frame numbers of frame sequences 14 from the frame number list output by the automatic scene change detector. By this, as the initial condition of the logical frame structure of the frame sequences, a logical frame structure 10 of one hierarchical level is created, with whole motion video image 12 being the parent node and with frame sequences 14 divided by automatic scene change detector 25 being the leaf nodes. In step 43, logical frame structure creating means 28 displays the logical frame structure in the initial condition on display 36. The user instructs the editing (division and merge) operation of the logical frame structure from alphanumeric input means 35, thereby to modify the construction of the initial logical frame structure and construct a logical frame structure of multiple levels.

Then, in step 44, representative frame creating means 27 determines the frame numbers of representative frames for the respective frame sequences. The representative frame is the frame at a predetermined position, for instance, the leading frame of a frame sequence, or a frame after a predetermined number of frames. For the determined frames rf, a motion video image is analogue/digital converted from LD 22 to create a still video image file. The representative frames automatically established in this step are modified as needed in step 45. At this time, a frame which is newly determined to be a representative frame is specified, for instance, by the user stopping the video image on TV monitor 23 at a particular frame. In step 46, the user inputs values for attribute item At describing the contents of the frame sequences, such as title and keywords for the frame sequences corresponding to the respective nodes of the logical frame structure. These attribute items are used as a key in retrieval. The attribute data and representative frame video images for the frame sequences created in the above steps are accumulated in files 31 and 32 of memory 29, in step 47.

Incidentally, in the above description, if the motion video image is stored as a digital video image, the process of converting an analogue motion video image to a digital motion video image can be omitted, and analogue/digital converter 24 and TV monitor 23 are obviated by displaying the motion video image on the display. Furthermore, this construction can be implemented by replacing personal computer 26 and host computer 37 with a plurality of workstations connected by a LAN.

Description is now made of the details of an embodiment of the creation and retrieval of motion video image information (representative frame video images and logical frame structures) accumulated in files 31 and 32 of memory 29 or files 41 and 42 of memory 40 according to the drawings.

First, description is made of the structure of the files for storing motion video image information, such as the logical frame structure of the frame sequences and representative frame video images which are accumulated in memories 29 and 40 of the host.

Figure 5:
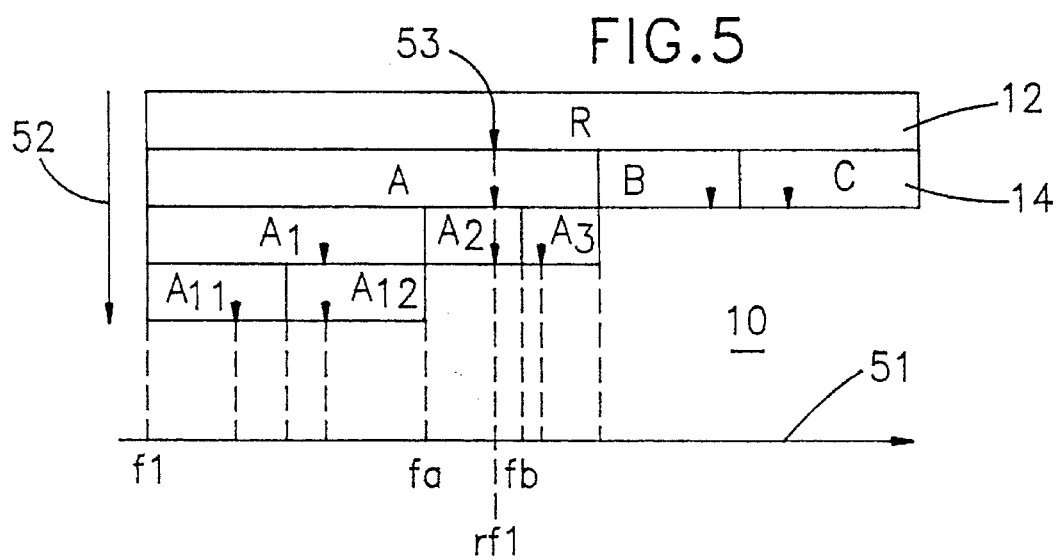
FIG. 5 is an illustration showing an example of the logical structure of frame sequences.

FIG. 5 shows an example of logical frame structure 10, with abscissa 51 as the frame number and with ordinate 52 as the depth of hierarchy. Whole motion video image 12 corresponds to root node (R) 15. Frame sequence A is divided at frames fa and fb and has child frame sequences A1, A2 and A3. Child frame sequence A1 further has grandchild frame sequences A11 and A12. In addition, the frame numbers of representative frames rf for the respective frame sequences are shown at the positions on axis 51 onto which mark 53 of representative frames rf is projected. For instance, the representative frames of R, A and A2 are all rf1.

Figure 6A:
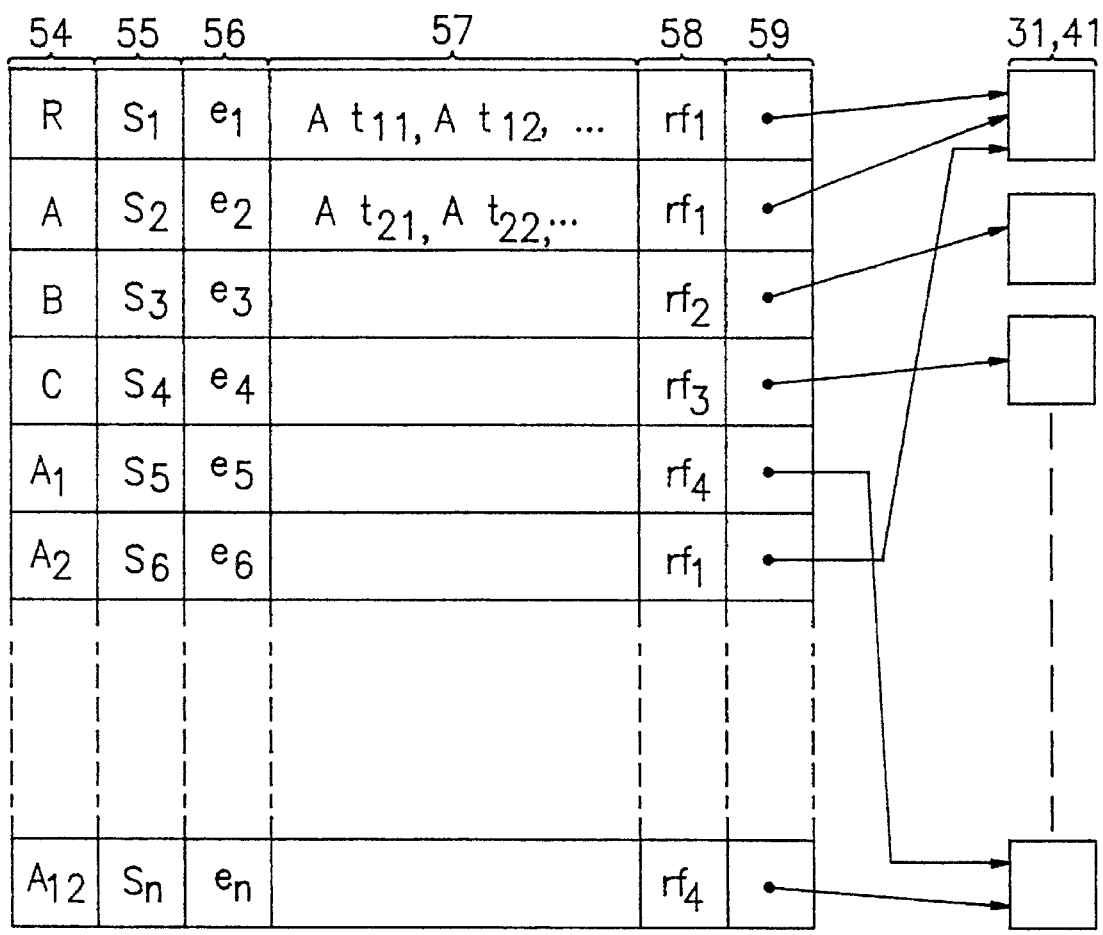
FIG. 6 is an explanatory view showing the structure of the files accumulated as retrieval information.
Figure 6B:
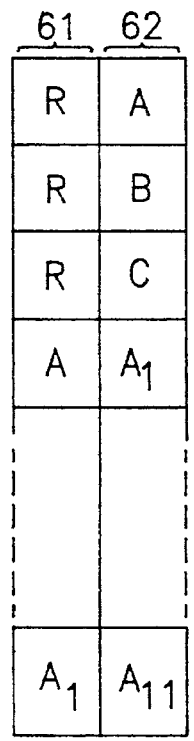

FIG. 6 is an example of the file structure for storing such motion video image information. (a) is the structure of logical frame structure data files (33, 42) for storing attribute data of frame sequences, and describes frame sequence identifier 54, start frame number 55 and end frame number 56 for the individual frame sequences 14 that are the nodes of the logical frame structure. Further, value 57 of attribute items (At11, At12, ...) describing at least one item or more of the details of title and keyword, and frame number 58 of the representative frame and reference pointer 59 of the representative frame to the still video image files (31, 41) are stored in one record. Assigned to frame sequence identifier 54 is, for instance, a value which uniquely identifies a frame sequence from a combination of start frame number 55 and end frame number 56. As to the hierarchical relationship of the frame sequences, a record in which parent frame sequence identifier 61 and child frame sequence identifier 62 are paired is stored in logical frame structure data files (33, 42), as shown in (b).

In step 43 of FIG. 4, modification of logical frame structure 10 is performed by the operation of dividing up a frame sequence to create child frame sequences and the operation of merging two frame sequences to create a parent frame sequence. As the operations therefor, specification is made of operation 70 (dividing frame sequence A to create child frame sequences A1 and A2 as shown in (A) of FIG. 7), operation 71 (creating child frame sequence B with frame sequence A being the parent as shown in (B)), operation 72 (dividing frame sequence B to create brother frame sequences B and B1 as shown in (C)), and operation 73 (merging brother frame sequences B1 and B2 to create parent frame sequence B as shown in (D)). Alternatively, operations 74 to 77, the inverse of these, are specified. If a new frame sequence is created by dividing and merging these frame sequences, a record for that frame sequence is added to the file of FIG. 6. In addition, if a new parent-child relationship is created by division of a frame sequence, then in data files (33, 42), the set of the identifiers of the parent and child is added to parent frame sequence identifier 61 and child frame sequence identifier 62.

In the modification operation for the logical frame structure in step 43 of FIG. 4, the representative frame of the child frame which is newly created by dividing a frame sequence is automatically established on the basis of the representative frame of the parent frame. The example shown in FIG. 8 shows the states before and after the representative frame numbers and pointers to the video image file are set for child frame sequences A1 and A2 created by division, when frame sequence A with frame f1 as its representative frame is divided at frame f2 (<f1). The representative frame f1 of the frame sequence A has reference pointer 80 to video image file I1. Since dividing frame f2 is of a frame number smaller than f1, the representative frame of A1 is leading frame f3, according to the default setting, and the representative frame of A2 is f1, the same as for A. In addition, pointer 81 of A2 to the video image file points to the same address as pointer 82 of A. An empty pointer 83 is assigned to A1, but when the video image file of frame f3 is created, it is replaced by the address of the file. Conversely, if frame sequences A1 and A2 are merged into A, one of the respective representative frames of A1 and A2 which is selected by the user becomes the representative frame rf of A.

In step 45 of FIG. 4, modification of the representative frame of a certain frame sequence affects both the parent frame sequence and the child frame sequences thereof along the hierarchy of frame sequences. The example of FIG. 9 shows the states before and after the representative frame of a frame sequence having child frame sequences is changed. Since child frame sequence A1 of A contains frame f2 when representative frame f1 of frame sequence A is changed to f2 (<f1), the representative frame of A1 is also changed to f2 in connection with A. With this, pointer 85 of A1 to the video image file will point to the same address as pointer 84 of A. The change of the representative frame of the parent frame sequence similarly affects the child frame sequences up to the frame sequences that are the leaf nodes. Simultaneously, if the representative frame of the frame sequence which is the parent of A is contained in A, the change of the representative frame of frame sequence A affects the parent frame thereof. The change of the representative frame of a child frame sequence similarly affects the representative frame of the parent frame thereof sequences up to the frame sequences of the root node.

Figure 10:
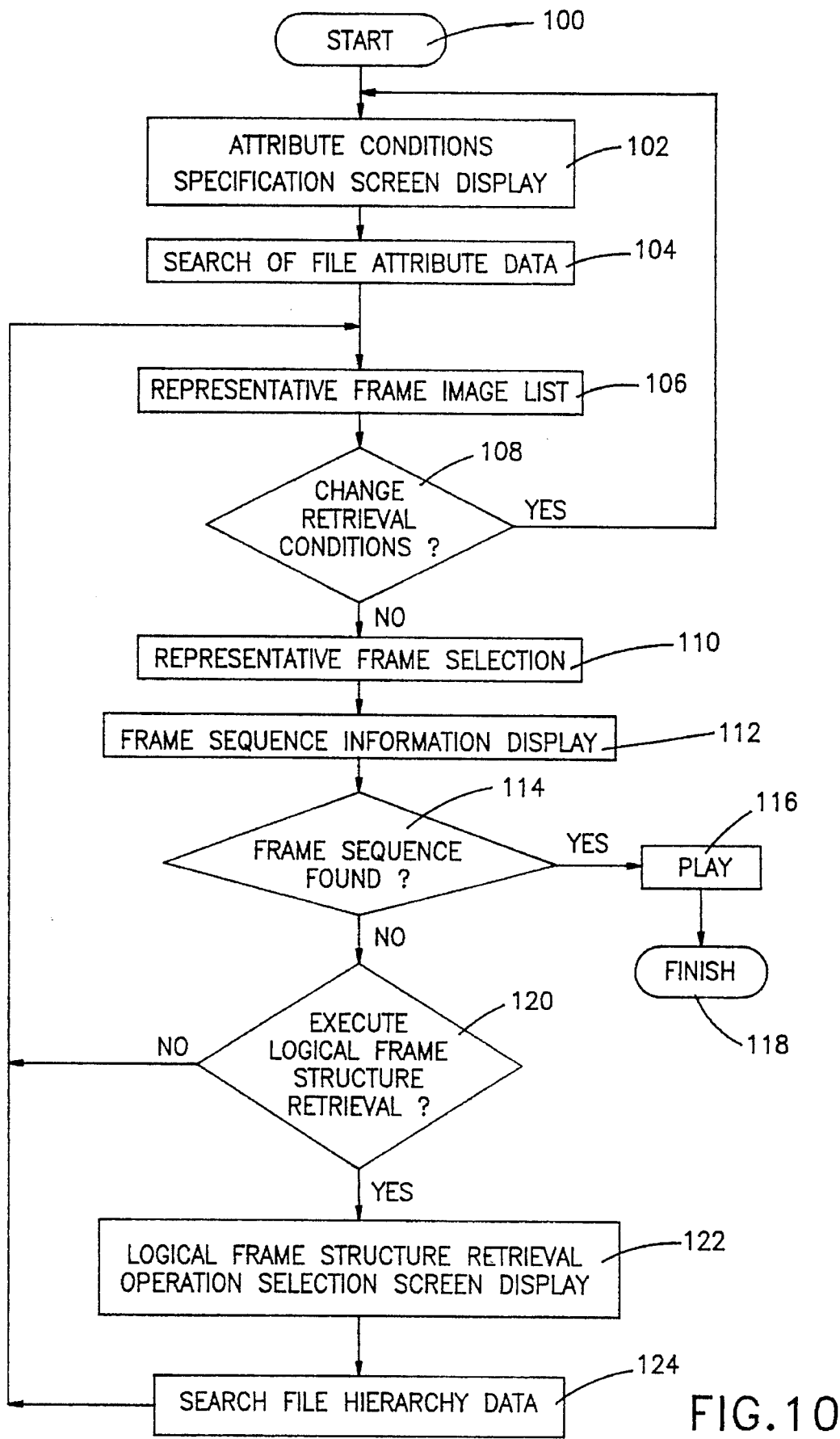
FIG. 10 is a flowchart showing an example procedure of the retrieval process by the system of FIG. 3.
Figure 11:
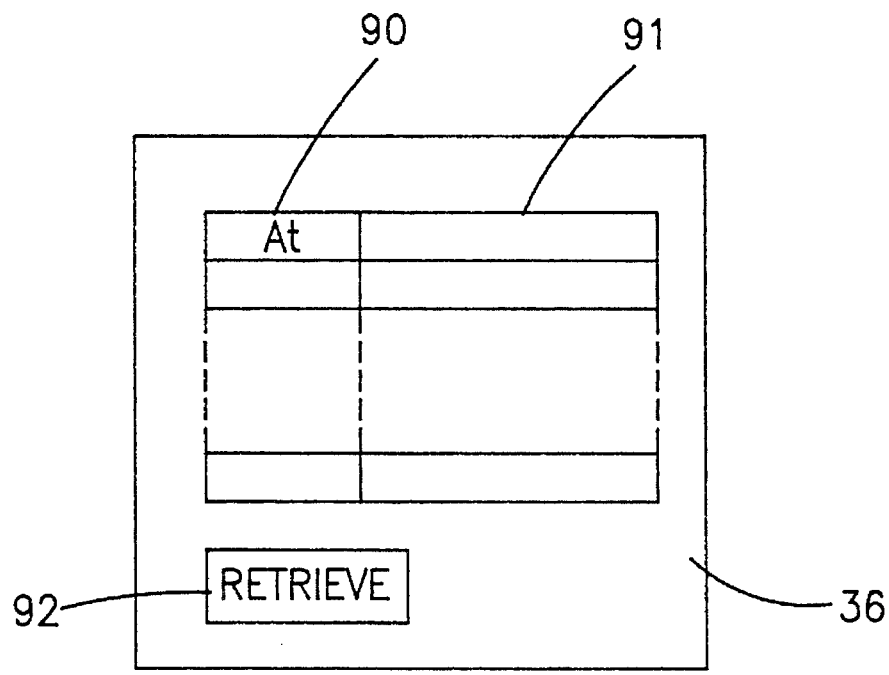
FIG. 11 is an illustration showing an example of the screen for specifying retrieval conditions in the retrieval process.

Retrieval processing using retrieval portion 37 is now described according to FIG. 10 and the subsequent figures. In retrieval, first a screen for specifying the retrieval conditions as shown in FIG. 11 is displayed on display means 36. The user inputs retrieval conditions for the motion video image information from input means 35 (step 102). That is, for each attribute item column 90 for a frame sequence which is desired to be retrieved, the user inputs values representing the respective retrieval conditions to condition specifying column 91 and depresses retrieval executing button 92. Retrieval means 39 performs a retrieval process for the file structure ((a) of FIG. 6) that stores the attribute data and the like of the frame sequences held in files 41 and 42 of memory 40 in accordance with the retrieval conditions (step 104), and as a result of the retrieval, outputs and displays the corresponding frame sequences on display 36. That is, as shown in the example screen of FIG. 12, a video image list of the representative frames rf of the frame sequences corresponding to the retrieval conditions is displayed (step 106).

If the video image list does not contain a representative frame rf that is desired to be retrieved, the user can depress attribute change button 93 to return to the initial screen, or the screen for specifying the retrieval conditions (FIG. 11) (step 108). If the representative frame rf that is desired to be retrieved is displayed in the representative frame list, when that region is pointed to and selected (step 110), the attribute data At for the particular frame sequence is displayed along with representative frame video image rf as shown in the example screen of FIG. 13 (step 112). If the frame sequence is found in the screen of FIG. 13, then upon depression of play button 96 by the user, retrieval means 39 sends a control signal for playing the indicated frame sequence to LD player 22. LD player 22 sends the analogue video image stored in LD 20 to TV monitor 23 to play and display it (step 116). If the user wants to see another representative frame video image rf, he can return to the screen of the representative frame list (FIG. 12) by means of list button 97 (step 120).

Figure 12:
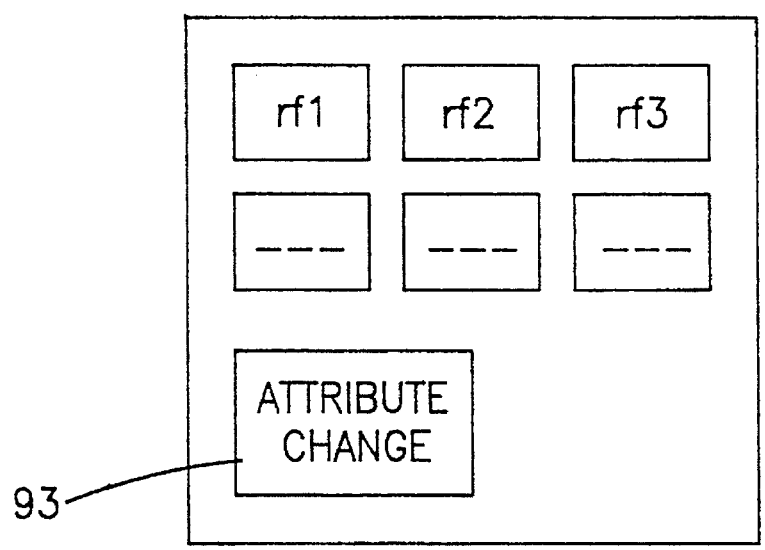
FIG. 12 is an illustration showing an example of the representative frame list screen in the retrieval process.
Figure 13:
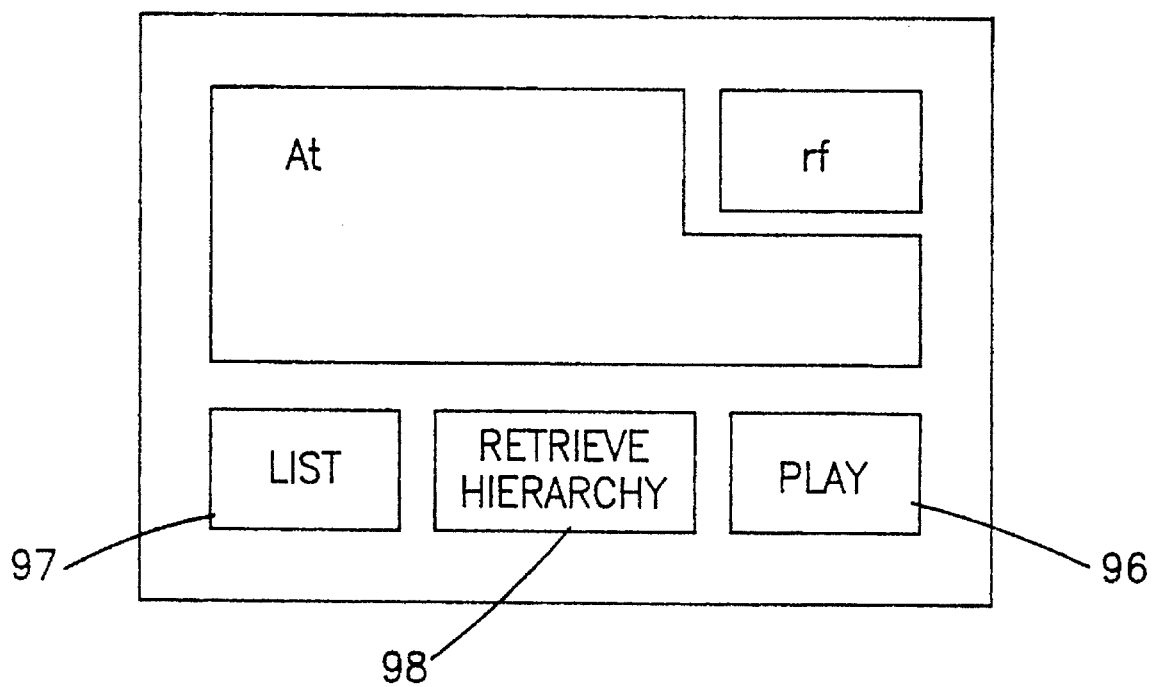
FIG. 13 is an illustration showing an example of the screen for displaying the attribute data of frame sequences in the retrieval process.
Figure 14:
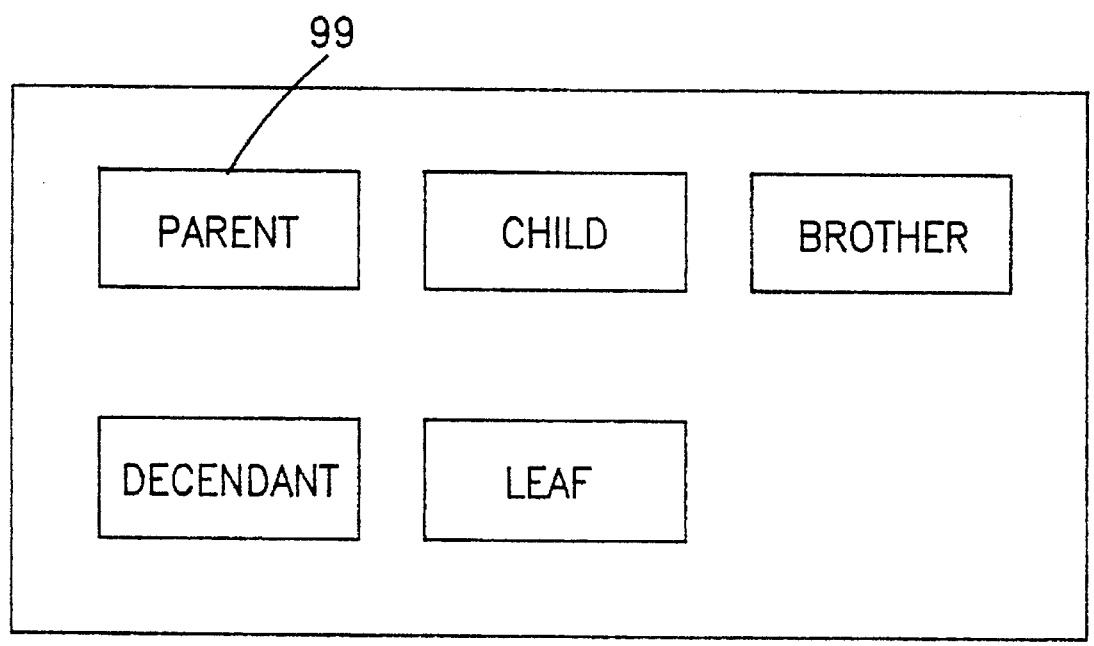
FIG. 14 is an illustration showing an example of the screen for selecting a retrieval operation along the logical frame structure in the retrieval process.

In addition, if hierarchy retrieval button 98 is depressed, selection buttons 99 for retrieval operation along the logical frame structure are displayed as a menu (step 122). The respective selection buttons 99 are to specify the operations for respectively retrieving frame sequences such as parent, child and brother frames on the basis of the frame sequence displayed in FIG. 13. For retrieving a child frame sequence from a parent frame sequence, if "child" of selection buttons 99 is depressed, identifiers 62 are searched for from the identifiers 61 of the parent frame sequence side of file 42 to extract, for instance, child frame sequences A1, A2 . . . for parent frame sequence A (step 124). If a grandchild sequence is retrieved, a search from parent to child frame sequences, namely from identifiers 61 to identifiers 62 is executed two times. If a "brother" frame sequence is retrieved, child frame sequences having the same parent frame sequence in identifiers 61 are searched for from identifiers 62. If "parent" is depressed to retrieve a parent frame sequence from a child frame sequence, identifiers 61 are searched for from the identifiers 62 of the child frame sequence side. The result of these retrievals is displayed as a screen of the representative frame list (FIG. 12).

The top-down method depicted in FIG. 2 can also be implemented by the system of FIG. 3. However, in this case, the automatic scene change detector and change frame number file are unnecessary, and the user creates a logical frame structure and representative frames in an interactive manner using representative frame creating means 27, logical frame structure creating means 28 and interactive input/output means 34 and records and holds them in memory 30. The retrieval method is the same as the above described example.

Since this application can be implemented by any hardware combination of host computer, personal computer, video equipment, etc. and can apply to both digital and analogue video images, it has a wide range of application.

Having thus described our invention what we claim as new and desire to secure as Letters Patent, is:

1. A motion video image retrieval system for retrieving and displaying a desired portion of a sequence of still video image frames forming a motion video image, said system comprising:

memory means, distinct from said motion video image, comprising: means for storing frame sequence data indicating the organization of said motion video image into a plurality of still video image frame sequences according to physical or semantic changes in scenes of said motion video image, means for storing still video image data frames representative of individual still video image frames of each of said frame sequences, means for storing logical frame structure data of said frame sequences, and means for storing attribute data for each of said frame sequences;

means for retrieving from said memory means a representative frame selected from said still video image data frames, corresponding to said logical frame structure and said attribute data for a selected frame sequence as selected by a user of said system; and means for displaying said retrieved representative frame of said still video image data frames from said retrieving means, on a video display, said retrieved representative frame being said desired portion of said motion video image.

2. A system as recited in claim 1, further comprising:

frame sequence generating means for organizing said individual frames of said motion video image into frame sequences according to changing scenes of said motion video image and for generating said frame sequence data;

means for determining a corresponding representative frame for each of said frame sequences and for generating said still video image data frames; and means for creating said attribute data for each of said frame sequences.

3. A system as recited in claim 2, wherein said frame sequence generating means comprises a scene change detector for detecting changes in scenes of said motion video image.

4. A system as recited in claim 1, further comprising:

logical frame structure creating means for creating a logical frame structure to describe the logical structure of said frame sequences while subdividing and merging said frame sequences into a frame inclusion relationship and for generating said logical frame structure data.

5. A system as recited in claim 4, wherein said logical frame sequence creating means automatically organizes frames of said motion video image into frame sequences according to an inclusion relationship, and wherein said logical frame structure creating means divides and merges said frame sequences into a logical frame structure according to user input.

6. A motion video image retrieval system for displaying a desired portion of a motion video image formed of a sequence of individual still video image frames, said system comprising:

means for storing a motion video image;

frame sequence generating means for organizing individual frames of said motion video image into frame sequences according to scene changes in said motion video image and for generating frame sequence information indicative thereof;

representative frame creating means for determining frames representative of said frame sequences and creating a still video image data frame for each of said representative frames;

logical frame structure creating means for creating a logical structure of said frame sequences, and for generating logical frame structure data indicative thereof, means for creating said attribute data for each of said frame sequences, memory means comprising:

means for storing frame sequence data indicating the organization of said motion video image into a plurality of frame sequences according to physical or semantic changes of said motion video image, and including said frame sequence information, means for storing said still video image data frames, distinct from said motion video image, for each of said representative frames of said frame sequences, means for storing said logical frame structure data, and means for storing said attribute data for each of said frame sequences;

means for retrieving from said memory means a still video image data frame, corresponding to logical frame structure data and said attribute data for a selected frame sequence as selected by a user of said system;

means for displaying at least one of a still image from said retrieval means of said representative frame from said still video image data frames, according to said logical frame structure data and said attribute data corresponding to said selected frame sequence, and an entire selected frame sequence of frames from said still video image data frames on a TV monitor responsive to logical frame structure data and attribute data entered by a user.

7. A motion video image retrieval system as recited in claim 6, wherein said logical frame structure creating means automatically creates a logical structure of said frame sequences while subdividing and merging said frame sequences according to a frame inclusion relationship.

8. A method for displaying a desired portion of a motion video image formed of a sequence of individual still video image frames, said method comprising:

storing frame sequence data, within a memory which is distinct from said motion video image, indicating the organization of said motion video image into a plurality of frame sequences according to physical or semantic changes in scenes of said motion video image, storing still video image data frames representative of individual frames of said frame sequences, storing logical frame structure data describing a logical frame structure of said frame sequences, and storing attribute data for each of said frame sequences;

retrieving from said memory an individual frame, the representative still video image data frame of which corresponds to logical frame structure data and attribute data for a selected frame sequence as selected by a user of said system; and displaying said individual frame, on a video display, said individual frame being said desired portion of said motion video image.

9. A method as recited in claim 8, further comprising the steps of:

organizing individual frames of said motion video image into frame sequences according to changes in scenes of said motion video image and including data indicative thereof in said stored frame sequence data;

creating attribute data for each of said frame sequences and including said attribute data in said stored attribute data; and determining a corresponding representative frame for each of said sequences and including said representative frames in said stored still video image data frames.

10. A method as recited in claim 8, wherein said logical frame structure of said frame sequences is created by subdividing and merging said frame sequences according to a frame inclusion relationship.

11. A method as recited in claim 8, further comprising: displaying still images of said frame sequences on said display.

12. A method as recited in claim 8, wherein said logical frame structure is created by dividing and merging said frame sequences according to user input.

* * * * *